(12) United States Patent
Tajima et al.

(10) Patent No.: US 7,207,598 B2
(45) Date of Patent: Apr. 24, 2007

(54) OCCUPANT PROTECTION DEVICE

(75) Inventors: Hiroyuki Tajima, Aichi-ken (JP);
Takahiko Sato, Aichi-ken (JP);
Akiyoshi Nagano, Aichi-ken (JP);
Masakazu Hashimoto, Aichi-ken (JP);
Toshikatsu Togawa, Aichi-ken (JP);
Osamu Fukawatase, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 413 days.

(21) Appl. No.: 10/874,751

(22) Filed: Jun. 24, 2004

(65) Prior Publication Data

US 2004/0262903 A1  Dec. 30, 2004

(30) Foreign Application Priority Data

Jun. 25, 2003 (JP) ............................. 2003-181242
Mar. 4, 2004 (JP) ............................. 2004-060987

(51) Int. Cl.
*B60R 21/045* (2006.01)

(52) U.S. Cl. ....................................... 280/752

(58) Field of Classification Search ............... 280/752, 280/753, 730.1; 296/70
See application file for complete search history.

(56) References Cited

U.S. PATENT DOCUMENTS 4,023,643 A * 5/1977 Bagley, Jr. ............ 280/753

6,916,042 B2 * 7/2005 Fukawatase et al. ........ 280/751
7,048,298 B2 * 5/2006 Arwood et al. .......... 280/730.1
2005/0087381 A1 * 4/2005 Tobata ...................... 180/271

FOREIGN PATENT DOCUMENTS

JP          04197847 A  *  7/1992
JP         A-4-278858      10/1992
JP        A-2001-122061    5/2001

* cited by examiner

*Primary Examiner*—Faye M. Fleming
(74) *Attorney, Agent, or Firm*—Posz Law Group, PLC

(57) ABSTRACT

In the occupant protection device according to the present invention, a restraint body joined with a driving mechanism is located near a target area of a seated occupant while being surrounded by an interior decoration member. Upon predicting a collision of the vehicle, the driving mechanism is actuated to protrude the restraint body from an opening in the interior decoration member for restraining the movement of the target area upon collision by its side facing the occupant, and when the collision is avoided, the driving mechanism returns the protruded restraint body in the opening of the interior decoration member. The restraint body is provided in the vicinity of its outer periphery with a retaining hole, a clip to be inserted in and retained by the retaining hole, and a guide surface for guiding the clip into the retaining hole for helping the restraint body to return in the opening of the interior decoration member. By this guide mechanism including the retaining hole, the clip and the guide surface, the restraint body is able to return to the opening of the interior decoration member smoothly without deteriorating the appearance.

9 Claims, 7 Drawing Sheets

OCCUPANT PROTECTION DEVICE

The present application claims priority from Japanese Patent Application No. 2003-181242 of Tajima et al., filed on Jun. 25, 2003, and Japanese Patent Application No. 2004-060987 of Tajima et al, filed on Mar. 4, 2004, the entireties of which are hereby incorporated into the present application by reference.

BACKGROUND OF THE INVENTION

1. Field of the Invention

The present invention relates to an occupant protection device which protects a vehicle occupant by restraining the movement of a target area of the seated occupant.

2. Description of the Related Art

As disclosed in JP 04-278858 A and JP 2001-122061 A, for example, in a conventional occupant protection device of this kind, a restraint body connected to a driving mechanism, such as a knee bolster or a knee panel, is located in front of and close to knees of a seated vehicle occupant while being surrounded by an interior decoration member, for protecting the occupant's knees.

In this occupant protection device, the restraint body shifts to a position for receiving the occupant's knees moving forward when the driving mechanism is actuated. If it is not predicted that the knees move forward after the restraint body once protrudes rearward from the interior decoration member, the driving mechanism is reactuated to return the restraint body to the original position in the interior decoration member.

When the restraint body is returned to the original position after protruding rearward of the vehicle, for example when the restraint body is positioned rearward in a prediction of a frontal collision of the vehicle, but the collision is avoided thereafter, the restraint body is desirably returned. However, when the restraint body returns, if there is little extra space along a surface of an edge portion of the interior decoration member between the restraint body and the edge portion of the interior decoration member around an opening for accommodating the interior member in light of appearance, it is liable that the restraint body cannot return to the original position appropriately, for example the outer edge of the restraint body overlaps on the opening edge of the interior decoration member.

Of course, if there is enough space between the outer edge of the restraint body and the opening edge of the interior decoration member in a direction along the surface of the opening edge of the interior decoration member, the restraint body will return smoothly. With this arrangement, however, a gap therebetween becomes large and the appearance facing the occupant is deteriorated.

SUMMARY OF THE INVENTION

The present invention contemplates to solve the above mentioned problem, and therefore, has an object to provide an occupant protection device capable of returning the restraint body to an opening in the interior decoration member smoothly without deteriorating the appearance.

The occupant protection device according to the present invention includes an interior decoration member located around a vehicle occupant, a restraint body, a driving mechanism, and a guide means. The interior decoration member includes an opening located near a target area of the occupant for the restraint body to restrain upon collision of the vehicle. The restraint body is accommodated in the opening of the interior decoration member, and protrudes from the opening for restraining the movement of the target area upon collision by its side facing the occupant. The driving mechanism is joined to the restraint body for moving the restraint body. The driving mechanism moves the restraint body to a position for restraining the movement of the target area of the occupant when a collision of a vehicle is predicted, and returns the restraint body protruded from the opening of the interior decoration member to the opening when the collision is avoided. The guide means is located in the vicinity of the outer edge of the restraint body for guiding the return of the restraint body to the opening of the interior decoration member.

In the occupant protection device of the present invention, the driving mechanism acts to protrude the restraint body from the opening of the interior decoration member toward the occupant when a collision of the vehicle is predicted. When the vehicle makes a frontal collision thereafter, the restraint body restrains the movement of the target area of the occupant by its side facing the occupant, and when a collision is avoided, the driving mechanism returns the protruded restraint body to the opening of the interior decoration member to prepare for a next occasion of collision. When returning, in the occupant protection device of the present invention, the restraint body is guided into the opening of the interior decoration member and accommodated in the original position smoothly by the guide means located in the vicinity of the outer edge of the restraint body, even if there is little extra space along a surface of the interior decoration member around the opening between the outer edge of the returned restraint body and the opening edge of the interior decoration member such that the appearance is improved.

Therefore, the occupant protection device of the present invention is able to return the restraint body to the opening in the interior decoration member smoothly without deteriorating the appearance.

Even if the assembling positions or the assembling directions of the interior decoration member and the driving mechanism vary a little from product to product, the device is able to return the restraint body to the opening of the interior decoration member smoothly by the guide means.

The interior decoration member is desirably provided in its edge around the opening with such a stepped portion for the outer edge of the restraint body to fit therein as to make the surface of the restraint body facing the occupant is flush with a surface of the interior decoration member around the stepped portion when the restraint body is accommodated in the opening with its outer edge fitted in the stepped portion. With this arrangement, the surface of the restraint body facing the occupant is flush with the surface of the interior decoration member therearound, so that the appearance of the vicinity of the restraint body is further well maintained.

The restraint body may be located in front of knees of a seated occupant for restraining the movement of the knees upon collision of the vehicle, for example.

Moreover, it will be appreciated that the outer edge of the restraint body and the edge of the interior decoration member around the opening are provided in corresponding positions with fitting portions detachably fitting each other when the restraint body is back in the original position, that at least either one of the pair of the fitting portions includes a guide surface for guiding the fitting of the fitting portions, and that the fitting portions and the guide surface constitute the guide means.

With this arrangement, when the fitting portions fit each other, at least one of the fitting portions is guided by the guide surface and located in a predetermined position of the other fitting portion smoothly, and thus the fitting portions fit each other, so that the restraint body is easily returned to the original position. Moreover, the guide means of this arrangement is easily provided by simple fitting portions and guide surface.

In this case, it is also appreciated that one of the pair of the fitting portions is a retaining hole while the other is a clip to be inserted in and retained by the hole in a detachable manner.

With this arrangement, when the fitting portions fit each other, the clip is guided by the guide surface and inserted into the center of the retaining hole smoothly, so that the restraint body is easily returned to the original position. In addition, if the clip is retained by being inserted into the retaining hole, the engagement of the fitting portions are maintained when the fitting portions fit each other, so that the outer periphery of the restraint body is prevented from being shaky against the opening periphery of the interior decoration member while the vehicle is traveling.

When the outer edge of the restraint body and the edge of the interior decoration member around the opening are provided in corresponding positions with fitting portions detachably fitting each other when the restraint body is back in the original position, it is also appreciated that the occupant protection device further includes a joint member which is joined at one end to the fitting portion formed on part of the restraint body and at the other end to a wind-up device for spooling off and winding up the joint member, and that the pair of the fitting portions, the joint member and the wind-up device constitute the guide means.

With this arrangement, if the fitting of the fitting portions is stopped and the restraint body protrudes from the interior decoration member, the joint member is spooled off from the wind-up device and extended toward the occupant. When the restraint body returns thereafter, if the wind-up device acts to wind up the joint member, the fitting portion on part of the restraint body is pulled by the joint member and smoothly guided to a fitting position of the fitting portion on part of the interior decoration member, and fitted in the fitting portion, so that the restraint body is smoothly returned to the original position. With this arrangement, moreover, a degree of protrusion of the outer periphery of the restraint body in spooling off the joint member is controlled easily by adjusting the length of the joint member to spool off in advance.

In this case, it is appreciated that the fitting portion on part of the interior decoration member is a retaining hole while the fitting portion on part of the restraint body is a clip to be inserted in and retained by the hole in a detachable manner, and that the joint member is put through the retaining hole and joined to a leading end of the clip.

With this arrangement, if the restraint body protrudes from the interior decoration member, the joint member is spooled off from the wind-up device and extended toward the occupant through the retaining hole. When the restraint body returns thereafter, if the wind-up device acts to wind up the joint member, the clip is pulled by the joint member running through the retaining hole and smoothly guided into the center of the retaining hole, so that the restraint body is smoothly returned to the original position. In addition, if the clip on part of the restraint body is retained by being inserted into the retaining hole formed in the opening edge of the interior decoration member, the engagement is well maintained, so that the outer periphery of the restraint body is prevented from being shaky against the opening periphery of the interior decoration member during the travel of vehicle.

Furthermore, it is also appreciated that the occupant protection device further includes a shielding member for preventing a foreign particle from entering in a clearance between the outer edge of the restraint body protruded from the interior decoration member and the opening edge of the interior decoration member such that the foreign particle may not be put in between the restraint body and the interior decoration member when the restraint body returns.

With this arrangement, foreign particles such as spare key or key fob hung down from a key inserted into the key cylinder, or cloths of the occupant are not put in between the outer edge of the restraint body and the opening edge of the interior decoration member, so that the restraint body is smoothly returned to the original position.

When the restraint body is located in front of knees of a seated occupant for restraining the movement of the knees upon collision of the vehicle, for example, the shielding member is located in the upper edge part of the restraint body on the assumption that key accessories hung down from an ignition key located in front of a driver are the foreign particles. In this case, the restraint body is smoothly returned to the original position without putting the key accessories in between itself and the opening edge of the interior decoration member.

Of course, the shielding member may also be located along the entire circumference of the outer edge of the restraint body, not only in the upper edge part of the restraint body.

Moreover, when the shielding member is housed, it may be folded in a bellows fashion, or may be rolled such that it is developed flatly when protruded.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
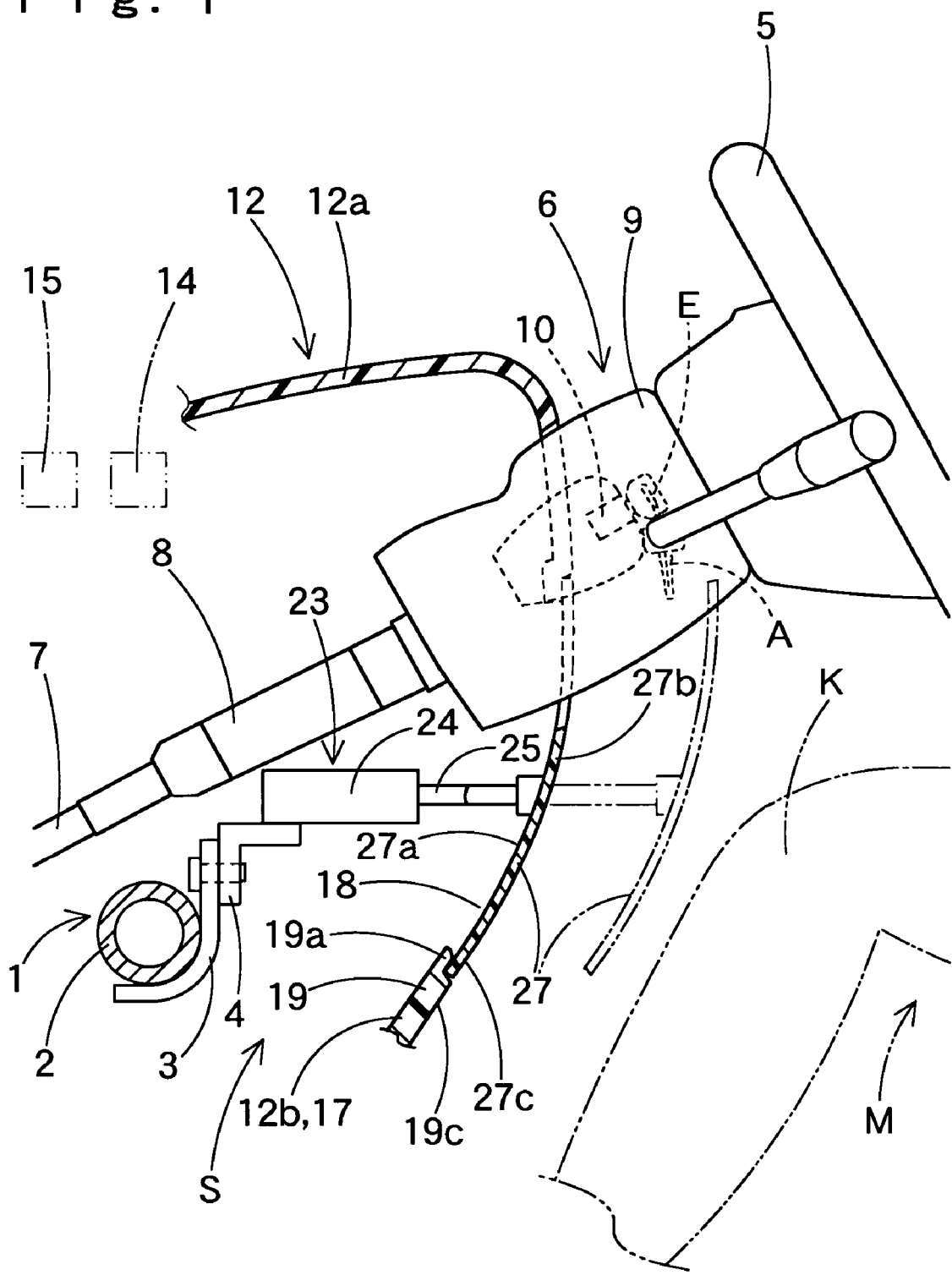
FIG. 1 is a schematic vertical section of an embodiment of the occupant protection device according to the present invention in service, taken along the front-rear direction of the vehicle.
Figure 2:
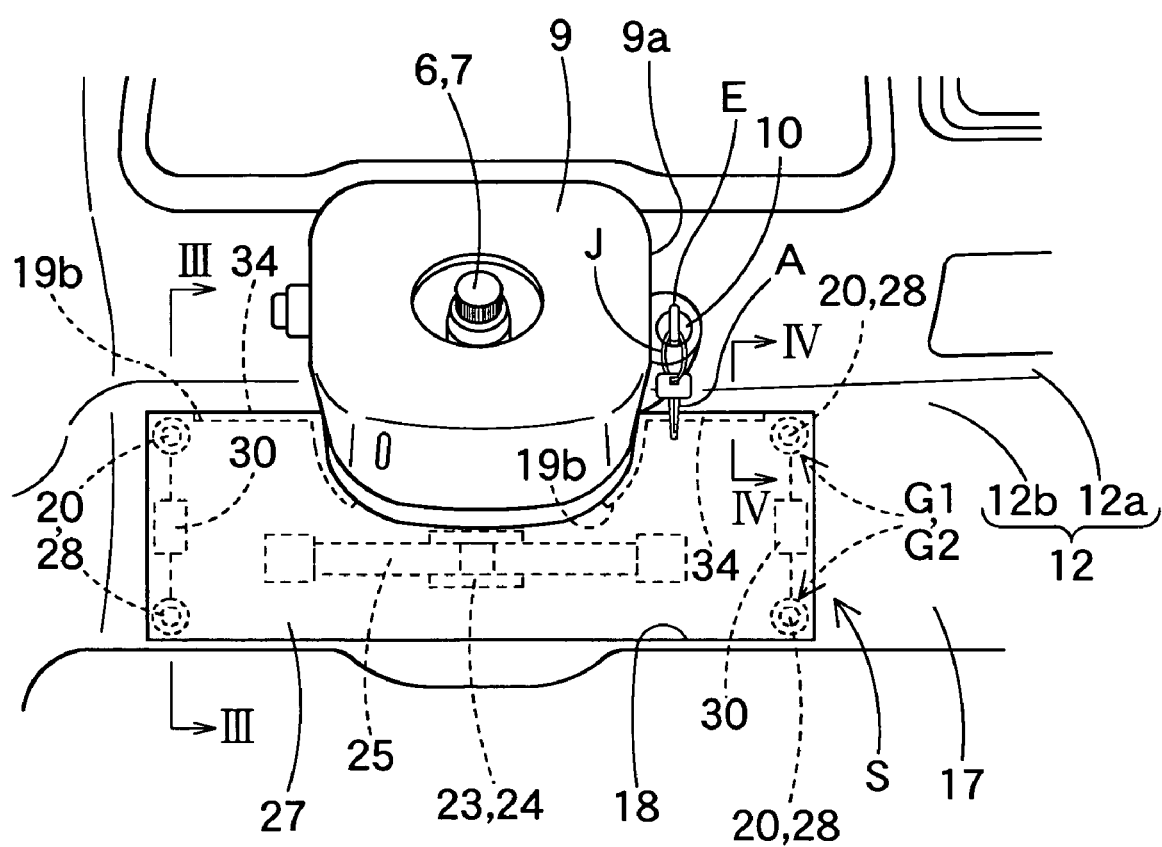
FIG. 2 is a schematic front view of the occupant protection device of FIG. 1.

Referring to FIGS. 1 and 2, an occupant protection device S is located below the steering column 6 and in front of a driver M as a vehicle occupant. The occupant protection device S assumes knees K of the driver M as a target area, and aims to protect the driver M by restraining the movement of knees K.

Up-down, front-rear, and left-right in this specification are based on a state in which the occupant protection device S is mounted on the vehicle, and therefore, correspond to up-down, front-rear, and left-right of the vehicle with the device mounted thereon.

Referring to FIG. 1, the steering column 6 includes a main shaft 7 connected to a steering wheel 5, a column tube 8 for covering the main shaft 7, and a column cover 9 for covering those members. The column cover 9 is located to ascend obliquely backward from an instrument panel (as will be called "dashboard" herein below) 12. As shown in FIGS. 1 and 2, in the right side 9a of the column cover 9 is located a key cylinder 10 to insert an ignition key E for starting engine thereinto. In the illustrated embodiment, accessories A such as a spare key (as will be called "key accessories A") are hung down from the ignition key E inserted in the key cylinder 10 by a connecting means J such as a connecting ring.

The occupant protection device S includes a restraint body 27 and an actuator 24. The restraint body 27 is located to cover an opening 18 formed in the interior decoration member 17 for restraining the knees K. The actuator 24 is adapted to drive the restraint body 27 as a driving mechanism 23. More specifically, the actuator 24 includes a hydraulic cylinder, an electric motor and so on, and moves a driving rod 25 back and forth, which is bifurcated rearward and having its rear ends joined to a front side 27a of the restraint body 27. The actuator 24 is controlled by a control device 14, and is held by brackets 3 and 4 extended from a rigid dashboard reinforcement 2 as a member of the vehicle body 1.

Figure 3:
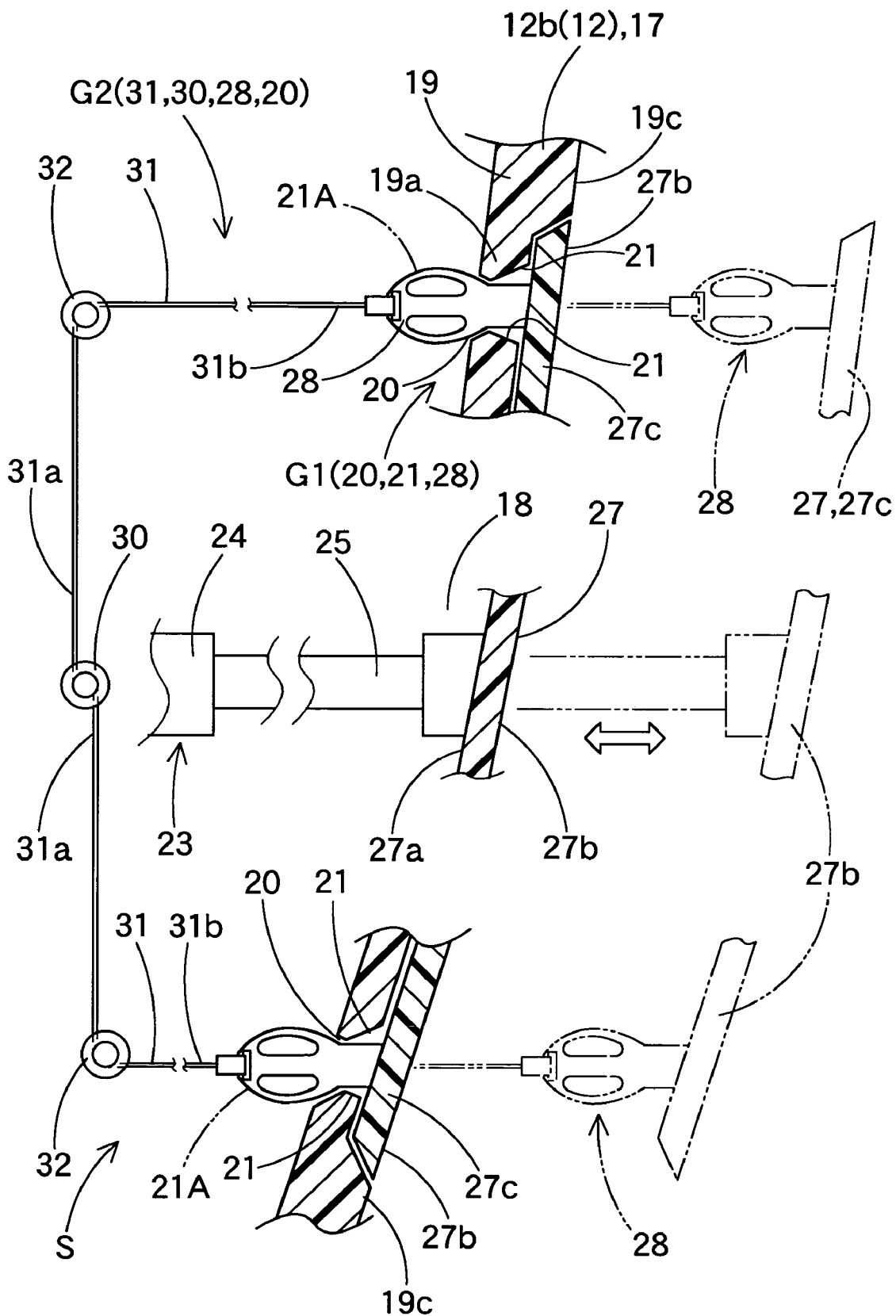
FIG. 3 is a schematic partial vertical section showing guide means of the occupant protection device of FIG. 1, taken along line III—III in FIG. 2.
Figure 4:
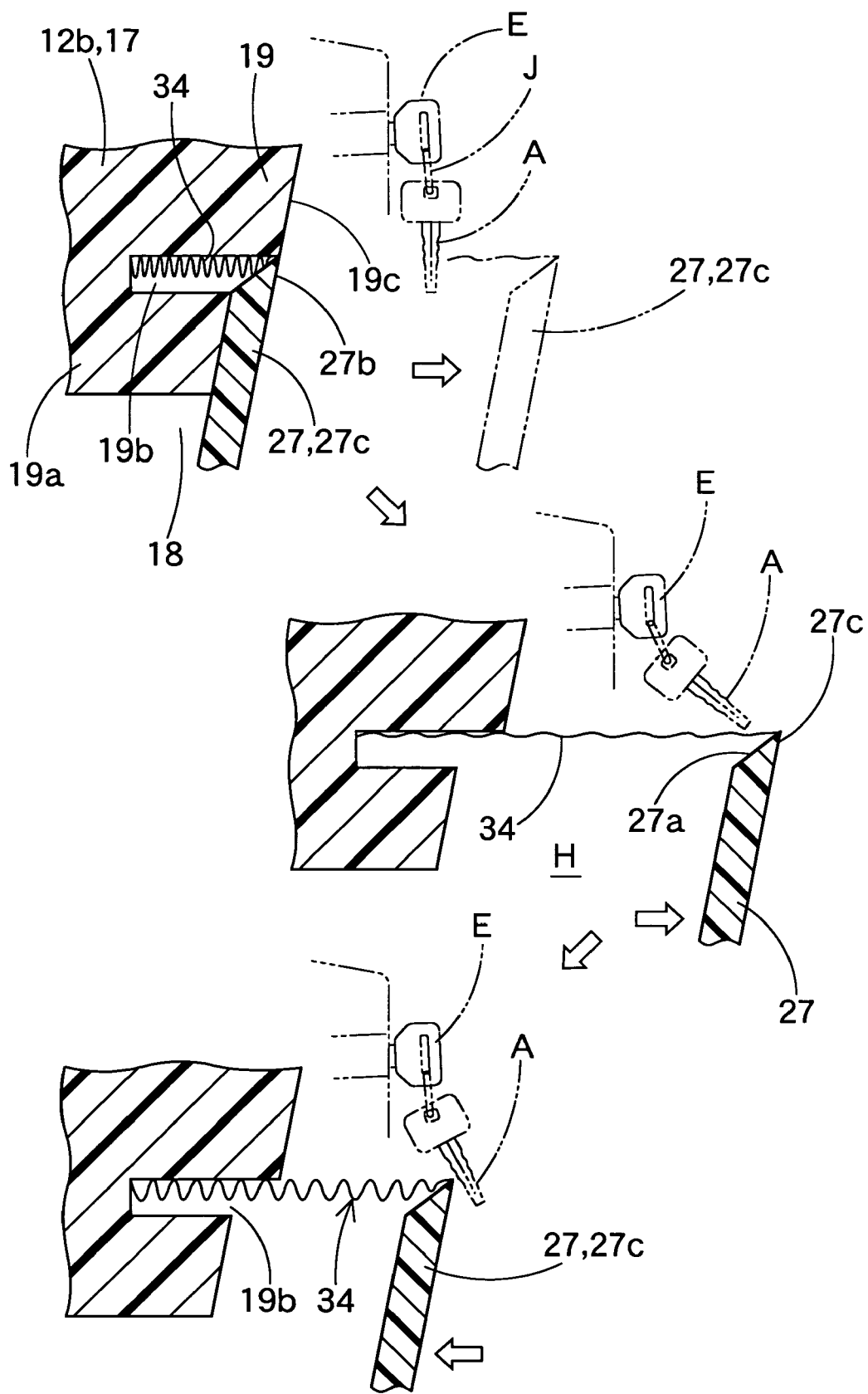
FIG. 4 is schematic partial sections illustrating the behavior of a shielding member of the occupant protection device of FIG. 1, taken along line IV—IV in FIG. 2.

The interior decoration member 17 in the illustrated embodiment is a lower panel 12b out of the dashboard 12 formed of an upper panel 12a and the lower panel 12b. In an area left and right of, and below the column cover 9 in the interior decoration member 17 is a substantially rectangular opening 18 for accommodating the restraint body 27, as shown in FIG. 2. The opening 18 goes through the interior decoration member 17 in the front-rear direction. Along the edge 19 of the opening 18 is a stepped portion 19a which is recessed forward from the rear surface of the lower panel 12b, and a retaining hole 20 is formed in each of four corners of the opening 18 in the stepped portion 19a, as shown in FIGS. 2 and 3. Each of the retaining holes 20 goes through the stepped portion 19a in the front-rear direction for serving as a fitting portion. Each of the retaining holes 20 is enlarged rearward to form a guide surface 21. As shown in FIGS. 2 and 4, there are formed grooves 19b in left and right portions of the upper part of the stepped portion 19a, and a shielding member 34 is folded and housed in each of the left and right grooves 19b.

These shielding members 34 are adapted to prevent foreign particles such as key accessories hung down from above from being put in between the restraint body 27 and an edge 19 of the interior decoration member 17 when the restraint body 27 is back in the original position. Each of the shielding members 34 is joined at its front end to the bottom of the groove 19b, and at its rear end to the front side 27a of the restraint body 27 in the position for closing the groove 19b, and is bellows-folded to be housed in the groove 19b. When the restraint body 27 protrudes rearward toward the driver M, as shown in FIGS. 4A and 4B, each of the shielding members 34 shields a clearance between the stepped portion 19a and the outer edge 27c of the restraint body 27.

The restraint body 27 is made from synthetic resin, metal or the like including cushioning material such as foam which is plastically or elastically deformable inward so as to receive the knees K of the driver M while giving as little impact as possible, and has a substantially rectangular shape. In the illustrated embodiment, the restraint body 27 is constructed such that its outer edge 27c fits in the edge 19 of the opening 18 of the interior decoration member 17 with almost no gap when it is accommodated in the opening 18. When accommodated, moreover, the rear surface 27b facing the driver M is flush with the rear surface 19c of an edge portion 19 of the interior decoration member 17 located around the stepped portion 19a. The restraint body 27 is provided at its four corners in the front side 27a with clips 28 to be inserted into the retaining holes 20 and retained in the peripheries of the retaining holes 20 in the front side of the stepped portion 19a. These clips 28 constitute a fitting portion on the part of the restraint body 27 while the retaining holes 20 constitute the fitting portion on the part of the interior decoration member 17. The clips 28 are retained by the retaining holes 20 in an extractable manner.

The retaining holes 20, the clips 28 extractably inserted in and retained by the retaining holes 20, and the guide surface 21 located in the periphery of the retaining holes 20 for guiding the insertion of the clips 28 into the retaining holes 20 constitute a first guide means G1 for guiding the restraint body 27 smoothly upon returning.

The leading ends of the clips 28 are joined with rear ends 31b of joint members 31. The joint members 31 constitute a second guide means G2 for guiding the returning restraint body 27 smoothly, and are made of flexible string members. Each of the joint members 31 is redirected by a rotatable pulley 32 supported by a vehicle body member, and has its front end 31a joined to a winder 30 which is also able to spool off the joint member 31. The winder 30 includes a wind-up roll joined to an electric motor controlled by the control device 14 and so on, and each one winder 30 is located near left and right edges of the restraint body 27. Each of the winders 30 is supported by a member as part of the vehicle body 1, and is able to wind up, and spool off the upper and lower joint members 31 together. The winder 30 is so constructed as to spool off the joint members 31 automatically if the joint members 31 are pulled toward the driver M.

The control device 14 is electrically connected with a plurality of sensors 15 located in bumper or the like. The sensors 15 are for detecting an obstacle approaching the vehicle from forward, and are exemplified by a type utilizing infrared rays or supersonic wave, or a type utilizing CCD camera. Based on signals from the individual sensors 15 and considering velocity of vehicle and other conditions, the control device 14 is adapted to perform two stages of detection, i.e., collision detection for predicting collision with an approaching object, and approach detection for detecting an approach of the object before performing the collision detection. Upon detecting an approach of an object, the control device 14 activates the actuator 24 as a driving mechanism 23, but then if it does not proceed to the collision detection stage thereafter, activates the actuator 24 to move the driving rod 25 back to the front side of the vehicle, and activates the winder 30 to wind up the joint members 31 which had been spooled off.

That is, in the occupant protection device S, if the control device 14 detects an approach of an object based on signals from the sensors 15, the actuator 24 as a driving mechanism 23 is activated. Then the actuator 24 protrudes the driving rod 25 rearward toward the driver M, such that the restraint body 27 moves to a position indicated by double-dotted lines in FIGS. 1 and 2. At this time, along with the rearward movement of the restraint body 27, each of the clips 28 comes out of the retaining hole 20 while pulling the joint member 31 rearward, and then the left and right shielding members 34 are flatly developed while shielding clearances H between the stepped portion 19a and the outer periphery 27c of the restraint body 27, as shown in FIGS. 4A and 4B.

Thereafter, if the control device 14 detects a collision based on signals from the sensors 15, the control device 14 maintains the protruded state of the restraint body 27 by keeping the actuator 24 and the winder 30 inactive. As a result, even if the vehicle makes a frontal collision and the knees K of the driver M move forward, the restraint body 27 receives the knees K with its rear side 27b confronting the driver M, restrains the movement of the knees K, and thus is able to prevent the driver M from slipping into a space below the dashboard 12.

On the other hand, if the vehicle can avoid a frontal collision and the control device 14 does not proceed to the collision detection stage after detecting an approach of an object, the control device 14 activates the actuator 24 to move the driving rod 25 forward and return, and also activates the winders 30 to wind up the joint members 31 running through the retaining holes 20. Then each of the clips 28 advances, and is guided into the center of the retaining hole 20 by the guide surface 21, and securely goes into the retaining hole 20 to be retained by the stepped portion 19a, so that the restraint body 27 is accommodated in the opening 18 of the interior decoration member 17 while the outer periphery 27c of the restraint body 27 is made flush with the rear surface 19c of the interior decoration member 17 located around the opening 18.

As thus described, in the occupant protection device S, upon predicting a collision of the vehicle, the driving mechanism 23 is activated to protrude the restraint body 27 rearward toward the driver M from the opening 18 of the interior decoration member 17. When the vehicle makes a frontal collision thereafter, the restraint body 27 restrains the forward movement of the knees K by its rear side 27b, and when a collision is avoided, the driving mechanism 23 returns the protruded restraint body 27 to the opening 18 of the interior decoration member 17 to prepare for a next occasion of collision.

When returning, even if there is little extra space along the rear surface 19c between the outer edge 27c of the completely returned restraint body 27 and the edge portion 19 of the interior decoration member 17 around the opening 18 in light of good appearance, the restraint body 27 is able to be accommodated in the opening 18 of the interior decoration member 17 smoothly by the guide means G1, i.e., the guide surfaces 21 formed in the vicinity of the outer periphery 27c of the restraint body 27, and the guide means G2 or the joint members 31.

Consequently, the occupant protection device S is able to return the restraint body 27 to the opening 18 of the interior decoration member 17 while keeping good appearance.

Moreover, even if the assembling positions of the interior decoration member 17 and the driving mechanism 23 having the restraint body 27 joined thereto, or the assembling directions of the interior decoration member 17 and the driving mechanism 23 which may affect a moving direction of the restraint body 27 vary a little from product to product, the restraint body 27 is able to return to the opening 18 of the interior decoration member 17 smoothly by the guide means G1 and G2.

In the foregoing embodiment, the guide means G1 is composed of a plurality of retaining holes 20 each having a guide surface 21 formed in the edge portion 19 of the interior decoration member 17 around the opening 18, and the clips 28 formed in the outer periphery 27 of the restraint body 27 to be inserted into the retaining holes 20. However, it will also be appreciated that each of the clips 28 is formed to taper forward, i.e. toward the leading end such that the tapering surface serves as a guide surface 21A, as shown in FIG. 3, to guide the clip 28 to go into the center of the retaining hole 20 smoothly. In this case, the clip 28 constitutes a fitting portion on the restraint body 27 part. It will also be appreciated that the retaining hole as a fitting portion on the part of the interior decoration member, and the clip as a fitting portion on the part of the restraint body are both provided with guide surfaces. It will further be appreciated that a retaining hole is formed in the outer periphery 27c of the restraint body 27 while a clip is formed in the edge portion 19 in the periphery of the opening 18 to be inserted into the retaining hole in the outer periphery 27c, and that a guide surface is formed in at least one of the retaining hole and the clip.

This guide means G1 is easily formed by simply structured retaining holes 20, clips 28, and by providing guide surfaces 21/21A to at least either the retaining holes 20 or the clips 28.

Moreover, in the occupant protection device S, the rear ends 31b of the joint members 31 are joined to the front end of each of the clips 28, and the front ends 31a of the joint members 31 are joined to the winder 30 which winds up and spools off the joint members 31. The clips 28, the retaining holes 20, the joint members 31 and the winder 30 constitute a guide means G2.

With this guide means G2, when the restraint body 27 returns from the protruded state from the interior decoration member 17, if the winder 30 acts to wind up the joint members 31 running through the retaining holes 20, the clips 28 are easily guided into centers of the retaining holes 20, and retained in peripheries 19a of the retaining holes 20, so that the restraint body 27 is placed in the originally accommodated position with its rear surface 27b in the outer periphery 27c made flush with the rear surface 19c of the interior decoration member 17 around the opening 18. Moreover, this guide means G2 is also able to control a degree of protrusion of the outer periphery 27c of the restraint body 27 in spooling off the joint members 31 easily by adjusting the length of the joint members 31 to spool off in advance.

Although the foregoing embodiment is equipped with both guide means G1 and G2, the occupant protection device may include only one of the guide means G1 and G2.

Other than the combination of the retaining holes 20 and the clips 28 inserted into the holes 20 and retained in peripheries of the holes 20, fitting structures of the fitting portions are exemplified by various structures such as a combination of a plurality of holes or concaves formed in either the part of the interior decoration member 17 or the restraint body 27 and convexes fittable in the holes or concaves and formed in the other restraint body 27 or the interior decoration member 17, or a combination of the opening 18 of the interior decoration member 17 itself and a plurality of retaining legs or convexes partially fittable with the periphery of the opening 18 or a convex fittable with the entire periphery of the opening 18. These fitting structures do not have to involve an engagement structure like an undercut structure as long as the opening 18 and the restraint body 27 can be positioned to each other. Yet, if the fitting portions involve an engagement structure like an undercut structure which can maintain the engagement while permitting the protrusion of the restraint body 27 upon collision of the vehicle, the outer periphery 27c of the restraint body 27 is prevented from being shaky against the opening edge 19 of the interior decoration member 17 while the vehicle is traveling.

Furthermore, the foregoing embodiment is provided with a shielding member 34 for preventing foreign particles such as key accessories A from entering in a clearance between the outer edge 27c of the restraint body 27 protruded from the interior decoration member 17 and an edge 19 of the interior decoration member 17 such that the foreign particles are not put in between the restraint body 27 and the opening edge 19 of the interior decoration member 17 when the restraint body 27 returns. As shown in FIGS. 4B and 4C, accordingly, the restraint body 27, when returning, does not put foreign particles such as key accessories A hung down from the key E inserted into the key cylinder 10 in between its outer edge 27c and the opening edge 19 of the interior decoration member 17, and therefore, the restraint body 27 is placed smoothly in the originally accommodated position.

Figure 5:
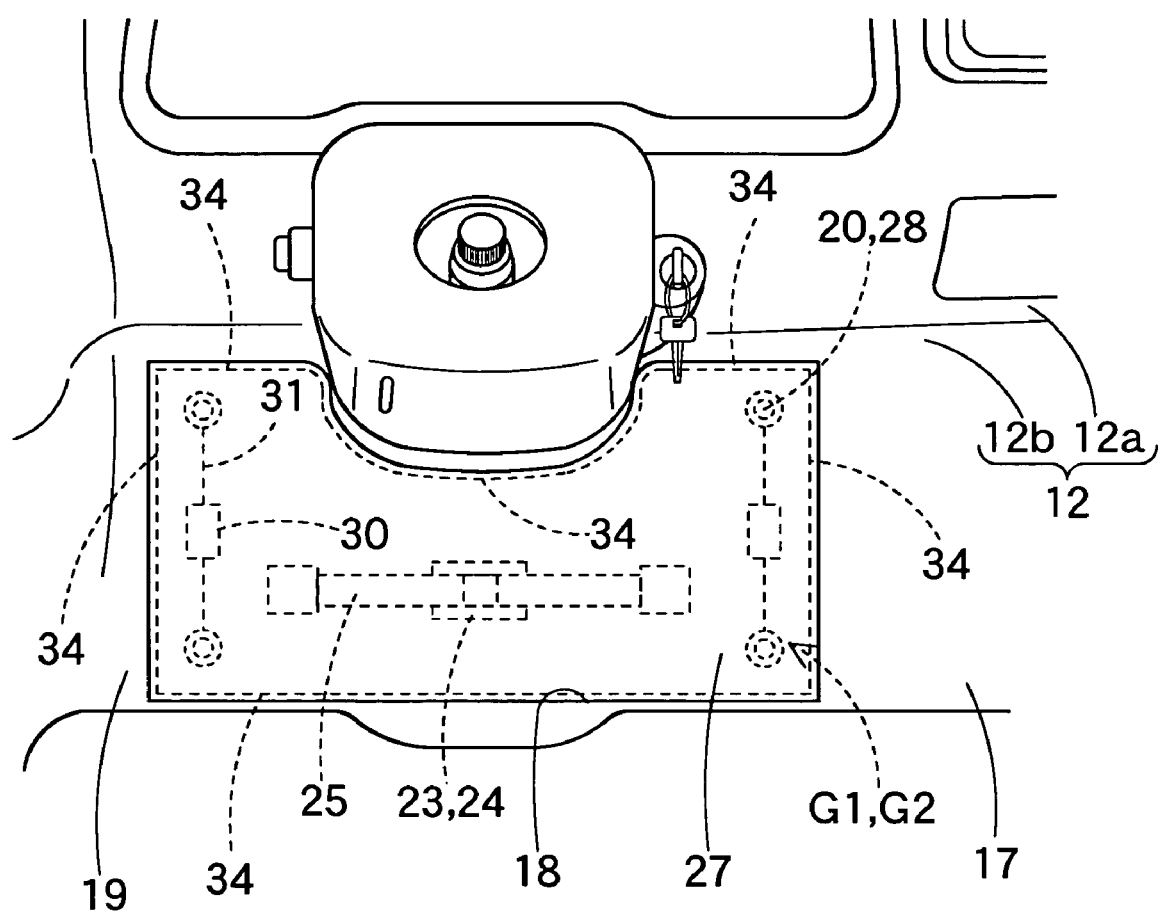
FIG. 5 is a schematic front view of another embodiment of the occupant protection device.

Although the shielding members 34 are located only in the upper edge part of the restraint body 27 in the foregoing embodiment, the shielding member may be located in the entire periphery 27c of the restraint body 27 as shown in FIG. 5, or alternatively, may be located partially in predetermined positions of the outer periphery 27c.

Figure 6:
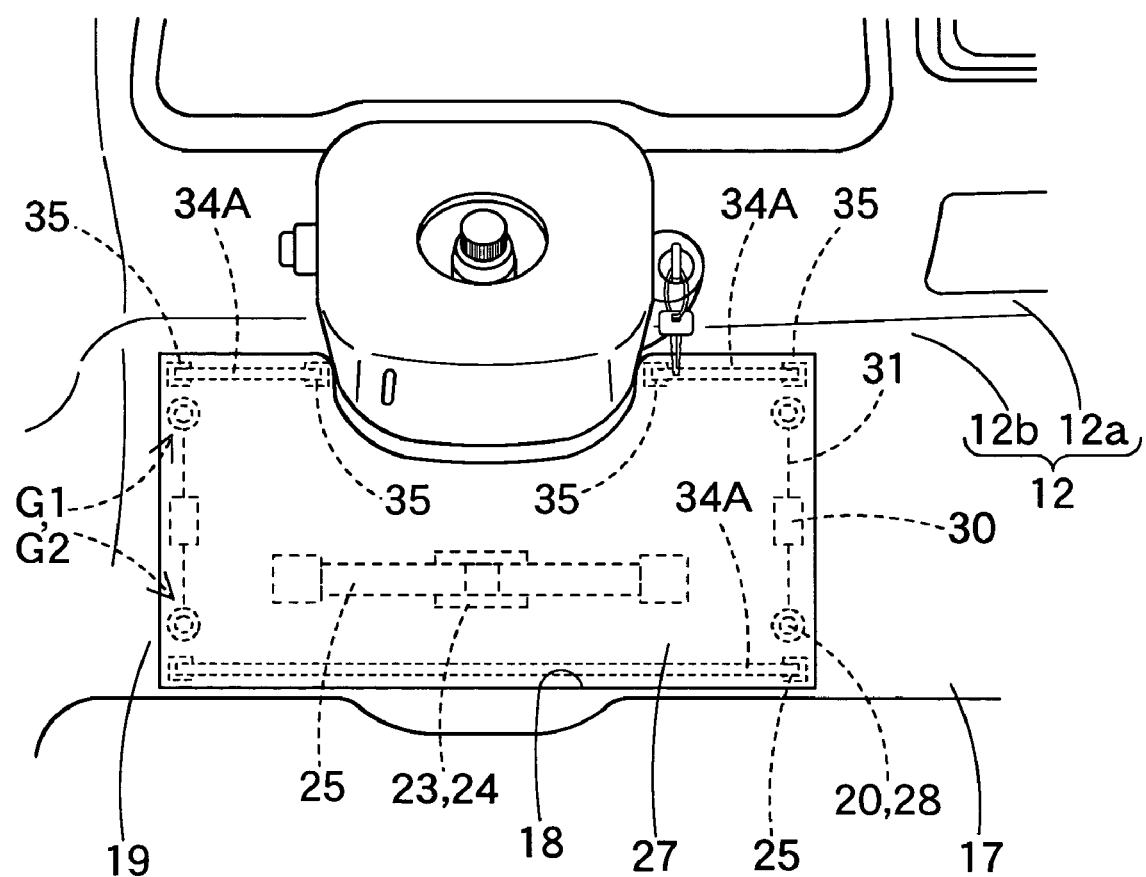
FIG. 6 is a schematic front view of yet another embodiment of the occupant protection device.
Figure 7:
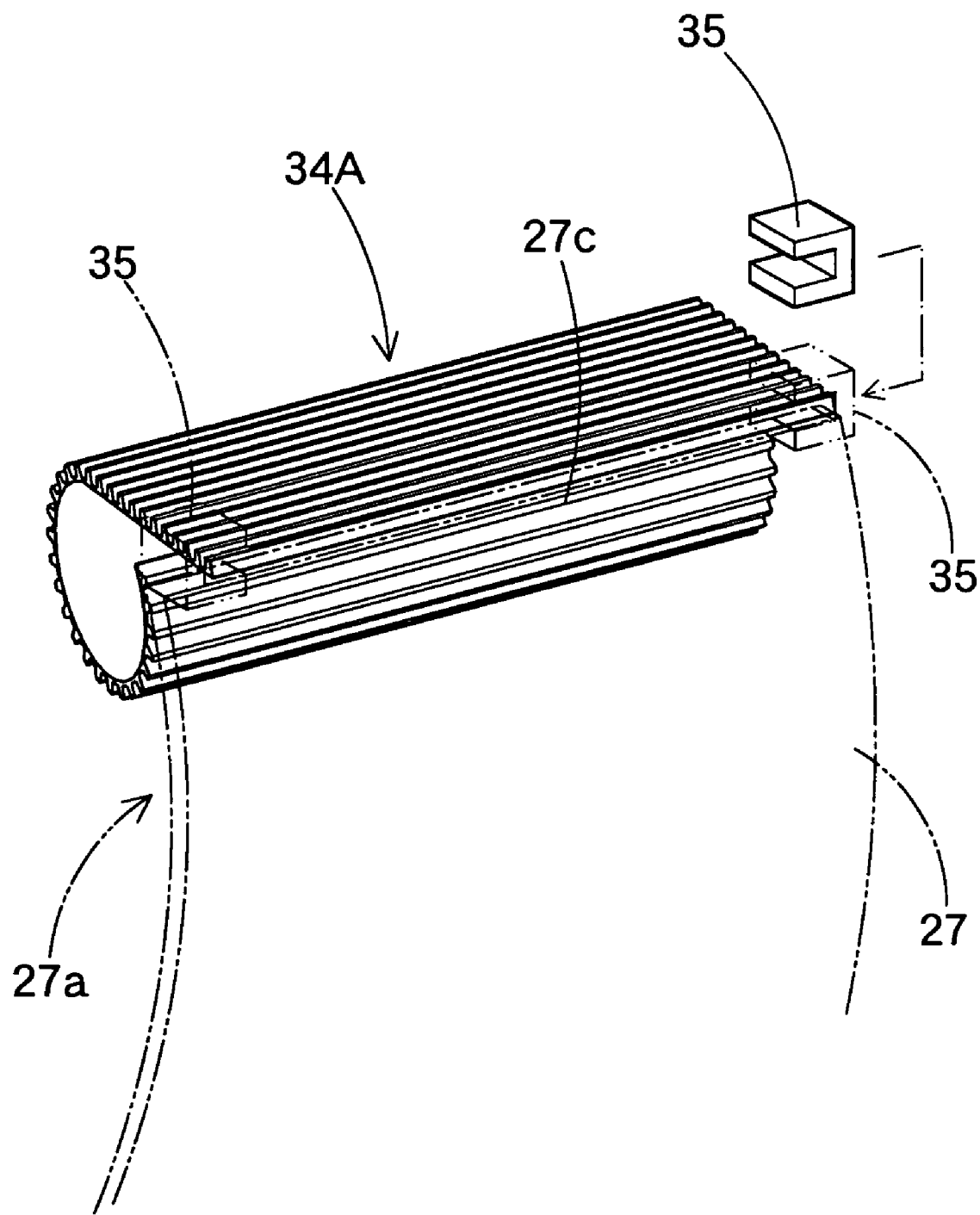
FIG. 7 is a schematic perspective view of a shielding member of the occupant protection device of FIG. 6.

It will also be appreciated to adopt a shielding member 34A as shown in FIGS. 6 and 7. This shielding member 34A is substantially sheet shaped and joined at the rear end to the front side 27a of the outer edge 27c of the restraint body 27. The shielding member 34A is developed flatly when the restraint body 27 protrudes, and is rolled and housed in an unillustrated case when it is pushed by the front side 27a upon returning of the restraint body 27. If left and right ends of the shielding member 34A are put through guides 35 each having U-shaped section, development and housing in the case in a rolled state of the shielding member 34A are smoothly performed.

Although the foregoing embodiment is described on the ground that the key cylinder 10 is located in the steering column 6 (column cover 9) itself, the present invention can also be applied to a case in which the key cylinder 10 is located in the upper panel 12a of the dashboard 12 and so on. In that case, the shielding member 34 or 34A is located to correspond to the key cylinder 10.

Although the foregoing embodiment shows an occupant protection device with a restraint body for knees located in front of the driver's seat, the occupant protection device including a restraint body for knees may be located in front of the front passenger's seat.

The foregoing embodiment shows the restraint body 27 for knees that moves back and forth along the horizontal direction when the driving mechanism 23 is actuated. However, it is sufficient that the restraint body 27 is protruded from the vicinity of knees K or a target area of the occupant to restrain the forward movement of knees K. Therefore, it will also be appreciated that the restraint body 27 protrudes by a linear movement from obliquely upward or downward, by a rotary movement around the upper edge or lower edge of the restraint body 27, or by a combination of linear and rotary movements.

Although the restraint body 27 in the foregoing embodiment is surrounded throughout its circumference by the interior decoration member 17 when accommodated, the present invention can also be applied to a case in which the restraint body 27 is partially surrounded by the interior decoration member 17, for example in a case where only the upper edge part and either left or right edge part of the restraint body 27 neighbor the interior decoration member 17.

Moreover, in the foregoing embodiment, the interior decoration member 17 with the opening 18 for accommodating the restraint body 27 is exemplified by the lower panel 12b of the dashboard 12. However, a column cover 9 may be the interior decoration member for accommodating the restraint body 27. When the restraint body is located in front of the front passenger's seat, furthermore, a lid of a glove box as well as the dashboard may be adopted as the interior decoration member for accommodating the restraint body.

In addition, not only occupant's knees, but also various areas of vehicle occupants such as head, breast, or thigh can be target areas for the restraint body of the occupant protection device according to the present invention to arrest. The target area is determined by a type of collision e.g., side impact collision or rear-end collision, as well as frontal collision. The occupant protection device of the present invention can be located in the interior decoration member near the target area.

What is claimed is:

1. An occupant protection device mountable on a vehicle, comprising:

an interior decoration member located around a vehicle occupant, the interior decoration member including an opening located close to a target area of the occupant to be restrained upon collision of the vehicle;

a restraint body accommodated in the opening of the interior decoration member, the restraint body protruding from the opening of the interior decoration member for restraining the movement of the target area upon collision by a side thereof facing the occupant;

a driving mechanism joined to the restraint body for moving the restraint body, the driving mechanism moving the restraint body to a position for restraining the movement of the target area of the occupant when a collision of a vehicle is predicted, and the mechanism returning the restraint body protruded from the opening of the interior decoration member to the opening when the collision is avoided; and a guide means located in the vicinity of the outer edge of the restraint body for guiding the return of the restraint body to the opening of the interior decoration member, wherein:

each of the outer edge of the restraint body and the edge of the interior decoration member around the opening is provided in a position corresponding to the other with a fitting portion, the fitting portions detachably fitting each other when the restraint body is back in the original position;

at least either one of the pair of the fitting portions includes a guide surface for guiding the fitting of the fitting portions; and the fitting portions and the guide surface constitute the guide means.

2. The occupant protection device according to claim 1, wherein one of the pair of the fitting portions is a retaining hole while the other is a clip to be inserted in and retained by the hole in a detachable manner.

3. An occupant protection device mountable on a vehicle, comprising:
- an interior decoration member located around a vehicle occupant, the interior decoration member including an opening located close to a target area of the occupant to be restrained upon collision of the vehicle;
- a restraint body accommodated in the opening of the interior decoration member, the restraint body protruding from the opening of the interior decoration member for restraining the movement of the target area upon collision by a side thereof facing the occupant;
- a driving mechanism joined to the restraint body for moving the restraint body, the driving mechanism moving the restraint body to a position for restraining the movement of the target area of the occupant when a collision of a vehicle is predicted, and the mechanism returning the restraint body protruded from the opening of the interior decoration member to the opening when the collision is avoided; and
- a guide means located in the vicinity of the outer edge of the restraint body for guiding the return of the restraint body to the opening of the interior decoration member, wherein the occupant protection device further comprises:
- a pair of fitting portions located in corresponding positions of the outer edge of the restraint body and the edge of the interior decoration member around the opening, the fitting portions detachably fit each other when the restraint body is back in the original position;
- a joint member joined at one end thereof to the fitting portion formed on part of the restraint body; and
- a wind-up device to which the other end of the joint member is joined, the wind-up device spooling off and winding up the joint member, wherein
- the pair of the fitting portions, the joint member and the wind-up device constitute the guide means.

4. The occupant protection device according to claim 3, wherein:
- the fitting portion on part of the interior decoration member is a retaining hole while the fitting portion on part of the restraint body is a clip to be inserted in and retained by the hole in a detachable manner; and
- the joint member is put through the retaining hole and joined to a leading end of the clip.

5. An occupant protection device mountable on a vehicle, comprising;
- an interior decoration member located around a vehicle occupant, the interior decoration member including an opening located close to a target area of the occupant to be restrained upon collision of the vehicle;
- a restraint body accommodated in the opening of the interior decoration member, the restraint body protruding from the opening of the interior decoration member for restraining the movement of the target area upon collision by a side thereof facing the occupant;
- a driving mechanism joined to the restraint body for moving the restraint body, the driving mechanism moving the restraint body to a position for restraining the movement of the target area of the occupant when a collision of a vehicle is predicted, and the mechanism returning the restraint body protruded from the opening of the interior decoration member to the opening when the collision is avoided; and
- a guide means located in the vicinity of the outer edge of the restraint body for guiding the return of the restraint body to the opening of the interior decoration member, wherein the occupant protection device further comprises a shielding member for preventing a foreign particle from entering in a clearance between the outer edge of the restraint body protruded from the interior decoration member and the opening edge of the interior decoration member, whereby the foreign particle is not put in between the restraint body and the interior decoration member when the restraint body is back in the original position.

6. The occupant protection device according to claim 5, wherein:
- the restraint body is located in front of knees of a seated occupant for restraining the movement of the knees upon a collision of the vehicle; and
- the shielding member is located in the upper edge part of the restraint body on the assumption that key accessories hung down from an ignition key located in front of a driver are the foreign particles.

7. The occupant protection device according to claim 5, wherein the shielding member is located along the entire circumference of the outer edge of the restraint body.

8. The occupant protection device according to claim 5, wherein the shielding member is folded in a bellows fashion when housed.

9. The occupant protection device according to claim 5, wherein the shielding member is rolled when housed, and is developed flatly when in service.

* * * * *